(12) United States Patent
Niklaus et al.

(10) Patent No.: US 10,164,473 B2
(45) Date of Patent: Dec. 25, 2018

(54) SYSTEM AND METHOD FOR DEVICE CHARGING

(71) Applicant: SEMICONDUCTOR COMPONENTS INDUSTRIES, LLC, Phoenix, AZ (US)

(72) Inventors: Markus Peter Niklaus, Fenin (CH); Michel Omer Anna Ghisleen De Mey, Waterloo (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 148 days.

(21) Appl. No.: 15/166,027

(22) Filed: May 26, 2016

(65) Prior Publication Data
US 2017/0237294 A1    Aug. 17, 2017

Related U.S. Application Data

(60) Provisional application No. 62/295,293, filed on Feb. 15, 2016.

(51) Int. Cl.
| | |
|---|---|
| *H01F 27/42* | (2006.01) |
| *H02J 50/12* | (2016.01) |
| *H02J 7/00* | (2006.01) |
| *H02J 7/02* | (2016.01) |
| *H02J 50/80* | (2016.01) |
| *H02J 50/90* | (2016.01) |
| *H02J 50/50* | (2016.01) |
| *H02J 9/00* | (2006.01) |

(52) U.S. Cl.
CPC ............ *H02J 50/12* (2016.02); *H02J 7/0004* (2013.01); *H02J 7/0027* (2013.01); *H02J 7/0045* (2013.01); *H02J 7/0047* (2013.01); *H02J 7/025* (2013.01); *H02J 50/50* (2016.02); *H02J 50/80* (2016.02); *H02J 50/90* (2016.02); *H02J 7/0042* (2013.01); *H02J 9/005* (2013.01); *H02J 2007/005* (2013.01)

(58) Field of Classification Search
CPC .......... H02J 50/12; H02J 7/0047; H02J 50/90; H02J 7/025; H02J 2007/005; H02J 50/80
See application file for complete search history.

(56) References Cited

U.S. PATENT DOCUMENTS

| | | | |
|---|---|---|---|
| 2003/0048095 A1 | 3/2003 | Zink et al. | |
| 2014/0176060 A1* | 6/2014 | Vorperian | H04R 25/55 320/108 |
| 2015/0380972 A1* | 12/2015 | Fort | A61N 1/3787 320/108 |
| 2016/0372959 A1* | 12/2016 | Faerber | H02J 7/0044 |

* cited by examiner

*Primary Examiner* — Jared Fureman
*Assistant Examiner* — Duc M Pham
(74) *Attorney, Agent, or Firm* — Robert F. Hightower (57) ABSTRACT

Aspects of the present disclosure involve a system and method for charging a device. The current disclosure also presents a cradle which can be used as an interface for communicating with external computing systems and power charging systems. In one embodiment, the cradle is used to down convert a high powered signal from a power charging system for use to charge a device such as a wearable. In another embodiment, the cradle is used to communicate with and external computing system for device upgrades and maintenance.

19 Claims, 7 Drawing Sheets

SYSTEM AND METHOD FOR DEVICE CHARGING

CROSS-REFERENCE TO RELATED APPLICATION(S)

This patent application claims the benefit of and priority to U.S. Provisional Application No. 62/295,293, filed Feb. 15, 2016, and entitled "SYSTEM AND METHOD FOR DEVICE CHARGING," which is incorporated herein by reference for all purposes.

TECHNICAL FIELD

This disclosure relates generally to device charging.

BACKGROUND

With the ubiquitous use of wireless electronics, power charging is in constant demand. However, the use of multiple wires to power the various electronics can become very inconvenient, hazardous and at times, not possible. As a solution, industry and academia have developed the concept of wireless power transfer using wireless charging systems. The wireless charging systems, however, although convenient for powering smart phones, tablets and the like are often inadequate for use with smaller electronics as the power supplied by the wireless charging systems may often be too large and can overwhelm and even damage the smaller electronics.

DETAILED DESCRIPTION

Aspects of the present disclosure involve systems, methods, devices and the like for charging small wireless devices. In one embodiment, a system or communication interface is configured to communicate with a power source for flexibly coupled wireless power transfer. The system receiving the electrical power can be a cradle designed to hold a small wireless device (e.g. wearable device), too small to be powered by the source directly. In particular, small wireless devices may include a similarly small battery to power the device. However, such small batteries or other power sources may be damaged when charged with a traditional wireless charging pad or system. The cradle can act as a communication interface between the power source and the small wireless device. The cradle can negotiate with the power source for power, receive the power, and down convert the electrical power received from power source to a level that accommodates the small wireless device such that the device may be charged safely.

In another embodiment, the cradle can also act as a communication interface which enables wireless communication between the device and an external computing system. In general, the cradle can connect to an external computing device and download information to and from the device and wirelessly transmit and/or receive information from the external computing system. The information exchanged can include software upgrades, data logs, biometric data, and the like to aid in the operation of the device.

Figure 1:
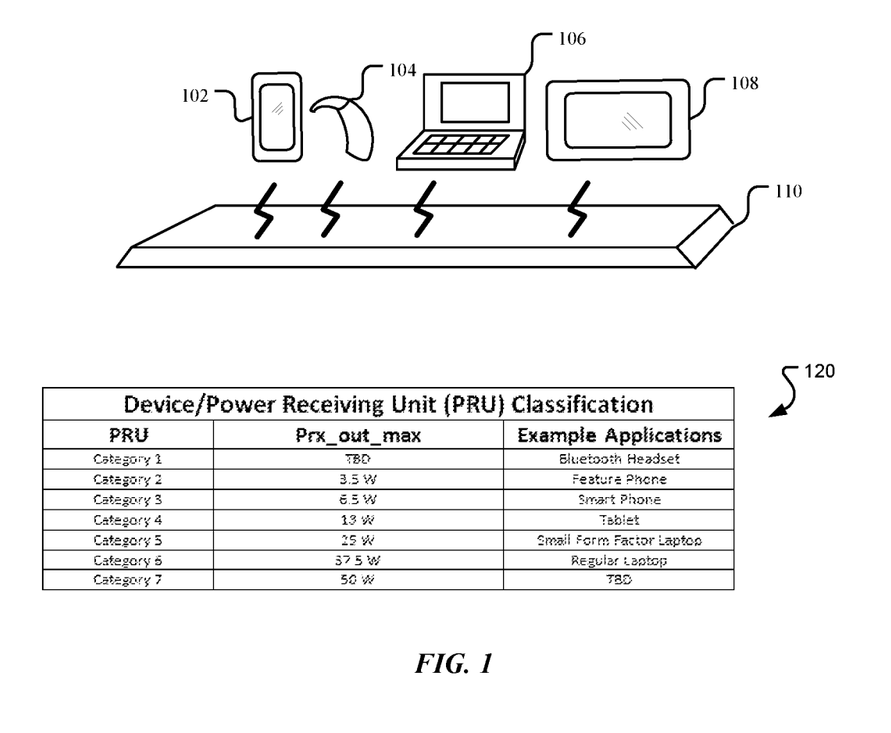
FIG. 1 is a diagram illustrating wireless power transfer.

Wireless power transfer (WPT) is the transmission of electrical power from a source to a device without the use of wires. WPT can occur with the use of a wireless charging system such as a power charging mat. FIG. 1, for example, is a diagram illustrating wireless power transfer using a power mat 110. The power mat 110 can be used to power multiple electronics 102, 106, 108, (commonly referred to as power receiving units (PRUs)) simultaneously. The electronics that can be charged on the power mat 110 can include but are not limited to smartphones 102, laptops 106, tablets 108, etc.

As illustrated in table 120, electronics in need of recharge may be classified into one of seven categories. The categories are organized by increasing wattage based on the maximum output power of the electronic. For example, a laptop 106 is a PRU that falls under category 6 with a maximum output power of 37.5 W. As another example, a smartphone 102 is a category 3 operating at a maximum output power of 6.5 W. Yet another example is tablet 108, whose maximum output power is 13 W and falls in category 4. These categories can aid in identifying the number of PRUs the power mat 110 can support as well as other charging capabilities of the power mat 110. For example, a power mat 110, commonly referred to as the Power Transmitting Unit (PTU), with 37.5 W of power available for delivery, can charge either one category 6 laptop or up to 4 category 3 smartphones. In this manner, the power mat 110 may control the type and number of PRUs that can be charged by the power mat 110 at any one time. In one embodiment, the power mat 110 can negotiate with the PRUs to determine the power needed the device. Therefore, by negotiating with the electronics, the power mat 110 is able to determine the number and type of electronics it may continue to power. However, as currently developed, the power mat 110 is limited to providing power to those electronics that can sustain above 3.5 W and classified above category 2. This limitation leaves smaller devices (e.g., wearables) without the capability of safely recharging using the power mat 110. As visible in table 120, there is currently no category for lower powered wearables such as Bluetooth® headsets, watches, or hearing aids 104 supported. In general, the lowest power provided by the power mat 110 is greater that a safe recharging power level for such electronics. In particular, the minimal power that may be provided to a device from the power mat 110 is 3.5 W and in some instances 2 W, however this is still too much power. This 2 W, for example, is an order of magnitude too high for a hearing aid 104 which can generally operate in milliwatts of power. Providing 3.5 W to a smaller device is not acceptable as the high wattage can compromise and even damage the device.

Figure 2:
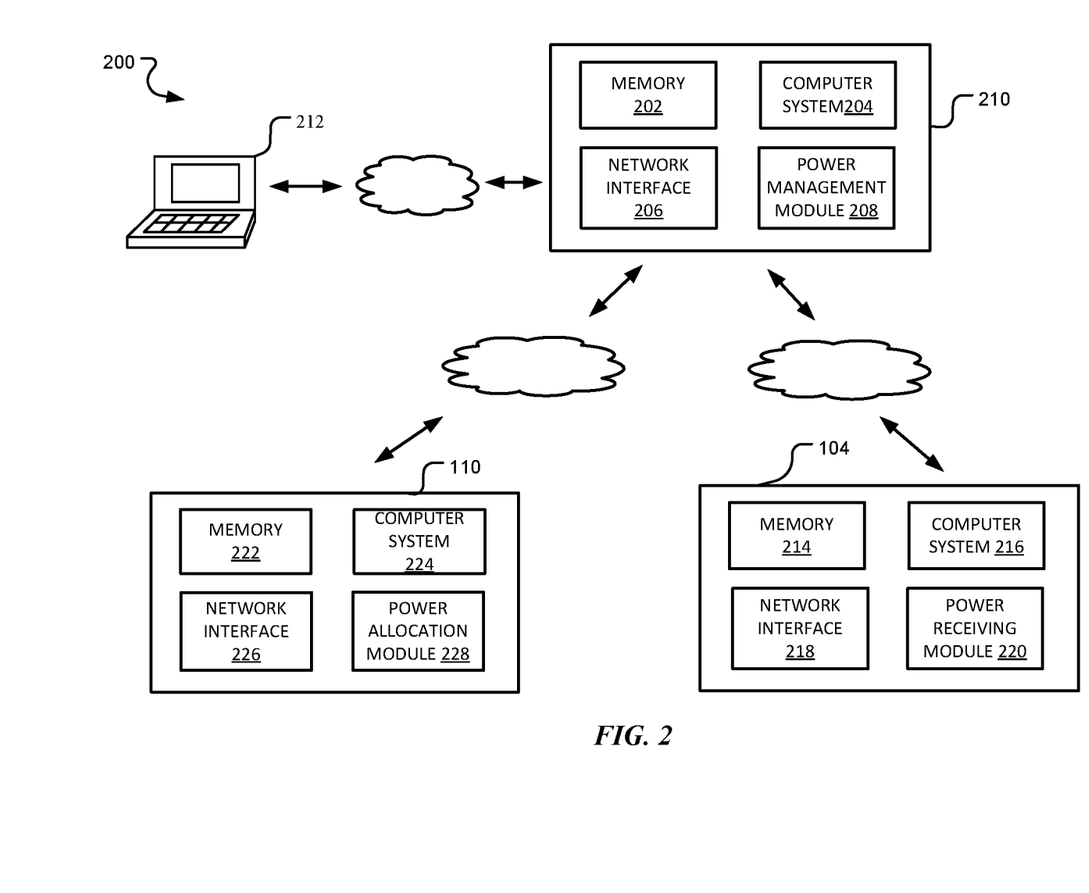
FIG. 2 is a diagram illustrating a system for providing power to a device using an interface.

To benefit from WPT, an interface can be used down convert the power received by the power mat 110 to an acceptable level for the device to use such that the device is not damaged. FIG. 2 is a diagram illustrating such a system 200 for providing power to a device using a power transfer/system interface, which will be referred to herein as cradle 210. The cradle 210 can be the interface used to transfer power between the wireless charging system (e.g. power mat 110) and any wireless device (e.g., a hearing aid 104) at a level that does not damage the device. In addition, the cradle 210 can also be used as a communication interface for the exchange of information between the device (e.g., hearing aid 104) and an external computing system 212.

As mentioned above, one type of device that may utilize the cradle 210 is a hearing aid 104. Although discussed herein as a hearing aid, it should be appreciated that the cradle 210 may be used to recharge any wireless device. The hearing aid 104 is a small wearable device that can be used to enhance hearing. The small architecture of the hearing aid 104, however, can make battery replacement both an inconvenience and a challenge. Therefore, having the ability to wirelessly recharge is of great benefit. The architecture of hearing aid 104 can include at least a computer system 216, a memory 214, a network interface 218 and a power receiving module 220. The computer system 216 can be a system which includes one or more processors for handling the data received for amplification, as well as for generating requests for power charging among other functions. Memory 214 can be the storage location where the hearing aid type, power requirements, as well as software, manufacturing data, biometrics, and other similar data may be stored. The network interface 218 can be a module used to provide the interface necessary to communicate wirelessly with the cradle 210, while the power receiving module 220 can store the power received and appropriately charge the hearing aid 104 battery.

In one embodiment, the hearing aid 104 wirelessly communicates with the cradle 210 to make a request for power. Therefore, the cradle 210 like the hearing aid 104, uses a network interface (206 and 218 respectively) for wireless communication. In addition, the cradle 210, being the interface for communicating with the power mat 110 can also include a processing unit or computer system 204 for processing the request. Computer system 204 can also be used to generate a request for power from the power mat 110. Further, the computer system 204 can be used to process information received from the hearing aid 104 for transmission to the external computing system 212 and/or from the external computing system 212 to the hearing aid 104. Still further, the computer system 204 can work with power management module 208, to perform other tasks such as but not limited to determining the power needed by the hearing aid, ensuring the hearing aid is not overwhelmed, and down converting the power received by the power mat 110 to an appropriate level for use by the hearing aid. Computer system 204 can also work closely with memory 202 for retrieving data necessary for processing the charging requests and/or retrieving data for transmission to and from the external computing system 212. For example, computer system 204 can work closely with memory 202 to retrieve the power required by the hearing aid if the hearing aid type was transmitted in the request for charging. As another example, the computer system 204 can work with memory 202 to store a software upgrade received from a manufacturer (external computing system 212) for download to the hearing aid 104, when the hearing aid 104 communicates with the cradle 210. Note that the architecture of the cradle 210 or other device, is not limited to the modules described above and can include one or more radios, sub-systems and other components which will be described in more detail below and in conjunction with FIGS. 5 and 8.

The power mat 110 is the device in system 200 which provides the power to the cradle 210. As such, it can also include a computer system 224, a network interface 226 and a memory 222 for receiving power charging requests from PRUs, contending with the PRUs, and generally communicating with the multiple PRUs for establishing a link. In addition, the power mat 110 can include a power allocation module 228 which can be used to determine at least the power available for WPT at the power mat 110, the number and types of devices the power mat 110 can support (e.g., based on the electronics category), and dynamically update as electronics are added (negotiate for power) or drop from the power mat 110.

As indicated, the cradle 210 can also communicate with an external computing system 212. The external computing system 212 can be a system located at a manufacturer, a doctor's office, a vendor or the like which can benefit from the data from the hearing aid 104. Alternatively, the external computing system 212 may be a personal computing device of the user of the hearing aid 104 for communicating with the hearing aid 104 directly. The external computing system 212 communicates with the cradle 210 which can then transfer the information to the hearing aid 104. Additionally or alternatively, the hearing aid 104 can download data for transmission to the external computing system. In one embodiment, the external computing system 212 can derive from the manufacturer of the hearing aid. The manufacturer in this instance can push software upgrades to the hearing aid 104 via cradle 210. In another example, the external computing system 212 can derive from a doctor's office where a doctor can use biometric data recorded at the hearing aid 104 to determine if the hearing aid user may require a replacement hearing aid, a new type of hearing aid, or adjustments need to be made. Still in another example, the external computing system 212 can derive from a vendor which can provide wireless maintenance support to the hearing aid 104. These are a few examples of the type of communication that can occur between the cradle 210 and the external computing system 212, other communication is possible and is not limited to the communication described.

Figure 3:
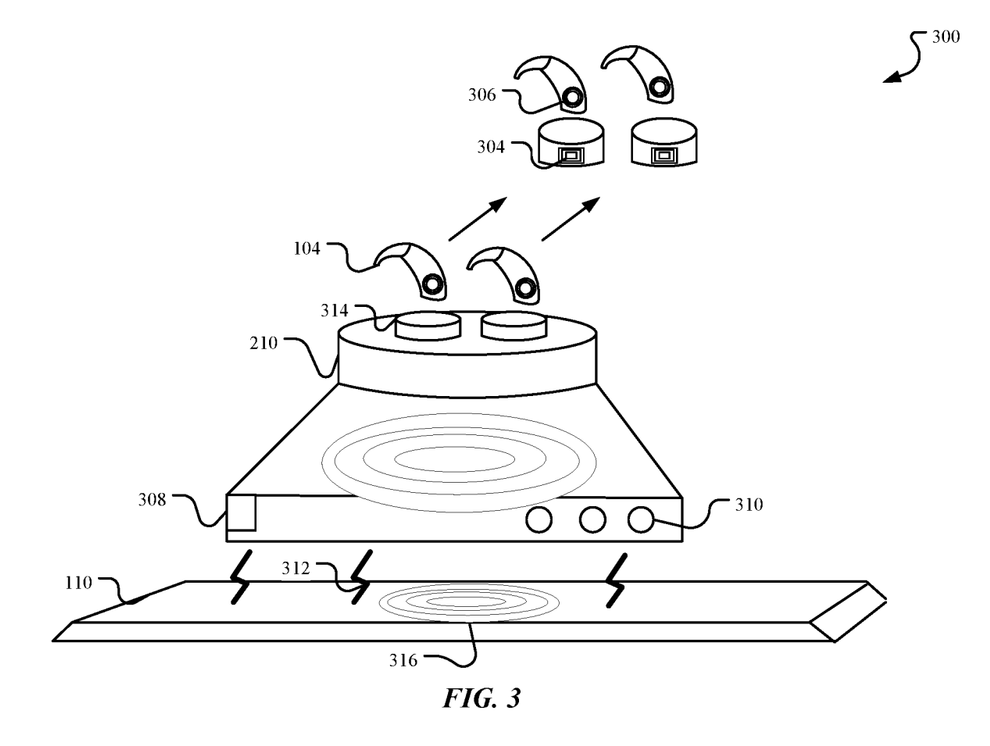
FIG. 3 is a diagram illustrating a system for providing power to a device using a cradle.

FIG. 3 is a diagram illustrating a system 300 for providing power to a device using a cradle 210. Specifically, FIG. 3 is a diagram illustrating WPT between the power mat 110 and hearing aids 104 using cradle 210. Cradle 210 is a system which can be used to ensure the hearing aids 104 are protected and can safely charge. The cradle 210 is a stand-alone device which can be placed directly onto the power mat 110 or in proximity to loosely couple to the power mat 110. In general, the cradle 210 provides an interface that shields the hearing aids 104 by intercepting the much stronger signals of the power mat 110 or other types of wireless charging system and down converts the power for usability by the hearing aids 104 and/or other wearables.

In order to intercept the much stronger signal of the power mat 110, two radio connections may be established between the PTU (power mat 110) and the PRU (cradle 210). In one particular example, the first radio connection is a Bluetooth® connection operating at 2.4 GHz. The Bluetooth® connection is used as a control signal in order to ensure the PTU can accommodate the different PRUs. Alternatively, another type of wireless connection may be established at the same or different frequency for negotiating with the PRU. As indicated in FIG. 1, electronics are classified into different categories and as such, the PTU ensures it is operating within its limits. To ensure correct operation, the PTU establishes a Bluetooth® connection or other type of wireless connection with each PRU in order to identify the different types of PRUs requesting power transfer, determine the number of PRUs, and the varying sizes of each PRU. By determining the details of each PRU, the PTU can negotiate with the PRUs to insure that the right amount of energy is being transmitted. Once the negotiation is complete, the wireless connection can be used to continually monitor the PRU in order to detect for possible faults that can lead to overheating or overcharging of the PRU. Note that in general a PRU needs to protect itself from any power it may receive, so that if the PTU fails, the PRU is not overpowered and damaged.

In one embodiment, the power mat 110 negotiates with the cradle 210 for wireless power transfer. Once negotiation is complete, the power mat 110 can transfer power to the cradle 210, while continually monitoring for faulty conditions. Note that although a Bluetooth® connection is being established for negotiating and monitor, other network connections are possible. For example, the network connection can include but is not limited to a Wireless Local Area Network (WLAN) connection, a Wireless Personal Area Network (WPAN) connection, a Wireless Mesh Network connection, a cellular network connection, and the like.

Once the first radio connection is established, a second radio connection may be established for wireless power transfer. In one embodiment, the second radio connection may be a resonant induction connection established at 6.78 MHz frequency with power transfer between 2 W and 50 W as illustrated in table 102 of FIG. 1. Alternatively, the second radio connection may be at any other frequency, with varying power transfers. The second radio connection is established for battery charging using inductive flux. Inductive flux is the production of electromotive force across a conductor such as a coil. The power mat 110 contains a coil 302 which can provide the near field wireless transmission of energy using resonant inductive coupling when coil 302 of cradle 210 nears another coil and the coils become magnetically coupled (e.g., coil 302 in cradle 210 and a coil 316 in power mat 110).

In general, resonant inductive coupling occurs when a varying or alternating current is run through a first coil. The current creates a short range magnetic field. As a second coil nears the first coil, the second coil enters the short range magnetic field created by the first coil. The magnetic field then creates an electric current that runs through the second coil transferring the electric power from the first coil to the second coil. In one embodiment, the coil 316 from the power mat 110 generates the short range magnetic field. The cradle 210 with a corresponding coil 302 enters this short range magnetic field which creates the electric current and hence the transfer of power. Since the power mat 110 creates a short range magnetic field, the power mat 110 and the cradle 210 are "loosely coupled." In other words, the cradle 210 does not need to be on the power mat, but in proximity of its magnetic field. With loosely coupled PRUs, the PRUs can be placed a short distance from the PTU or on the PTU without specific alignment. In one embodiment, the power mat 110 is loosely coupled from the cradle 210. Therefore, for example, the power mat 110 can be concealed below a wooden table and still able to power the cradle 210 and other devices located on the table.

Recall that in performing a WPT, both a Bluetooth® connection (using an independent antenna for transmitting and receiving) and an inductive coupling connection may be established and used. Therefore, the cradle 210 communicating with the power mat 110 may also be equipped with at least the radio necessary to establish the Bluetooth® connection and the coil 302 for receipt of the energy transfer. Once the power has been transferred to the cradle 210, the cradle 210 may accommodate the smaller power requirements of the hearing aid 104. To do so, the cradle 210 down converts the power received from the power mat 110, to a level acceptable by the hearing aid 104. Once the power is at the desired level, cradle 210 performs a wireless power transfer with the hearing aid 104. Note that in some instances, the power received from the power mat 110 can also be used to power the cradle for functionality. Therefore, in some instances, the WPT can partially be used to power the cradle 210 and the rest down converted for use by the hearing aid 104.

The hearing aid 104, ready for power transfer, sits in a sub-cradle 314. The sub-cradle 314 includes a coil 304 which enables the transfer of power to the hearing aid 104 using resonant inductive coupling, similar to the inductive coupling described above between the power mat 110 and the cradle 210. The hearing aid 104 also contains a small coil 306 which enters the magnetic field generated by coil 304 of the sub-cradle 314 for wireless power charging. The use of sub-cradles 314 allows for power transfer and safety as the charging of the hearing aid 104 can be continuously monitored by the cradle 210. Further, the sub-cradles 314 can adapt to the hearing aid 104 regardless of type, style and/or power requirements. For example, hearing aid 104 can be of varying types including, a behind-the-ear (BTE) hearing aid, a Mini BTE aid, an in-the-ear (ITE) aid, In-the-Canal (ITC) aid, completely-in-the-canal (CIC) aid, etc. Also, the hearing aids 104 can be of varying makes or brands each with corresponding resonant coils 306 and circuitry to permit the receipt of the transferred energy for recharging the hearing aids 104 battery. Further, the sub-cradles can be exchangeable to hold the varying types of hearing aids.

To ensure correct power is transferred to the type of hearing aid 104 docked in the sub-cradle 314, the hearing aid 104, during a request for power transfer from the cradle 210, can send type and power requirements among other information or requests. The power request for power transfer can come in the form of data sent over a Bluetooth® or other wireless connection, similar to the radio connection established between the power mat 110 and the cradle 210. Alternatively, the cradle 210 can contain the information stored within a memory module 202 as discussed in conjunction with FIG. 2. Retrieval of the hearing aid 104 parameters can occur automatically from a memory module 202 (or memory module 214 in hearing aid 104) during negotiations between the hearing aid 104 and the cradle 210. However, in other instances, the hearing aid parameters can be manually inputted using one or more of the indicator and control buttons 310. The indicator and control buttons 310 can be multi-functional. For example, the indicator and control buttons 310 can be used for functions such as, but not limited to identifying a communication between the cradle 210 and the hearing aid 104, identifying a communication between the cradle 210 and the power mat 110, identifying completion of a WPT, controlling power of the cradle 210, controlling communication between an external computing system 212, and selecting the type of hearing aid 104 mounted.

In some instances, the cradle 210 may encounter situations where the power mat 110 is unable to support the cradle 210 or a power mat 110 is not readily available. To overcome the lack of power, the cradle 210 is equipped with a power plug 308 for standard wired powering of the cradle 210. The power provided by the power plug 308 can be used to power the cradle 210, which in turn powers the hearing aid 104.

Figure 4:
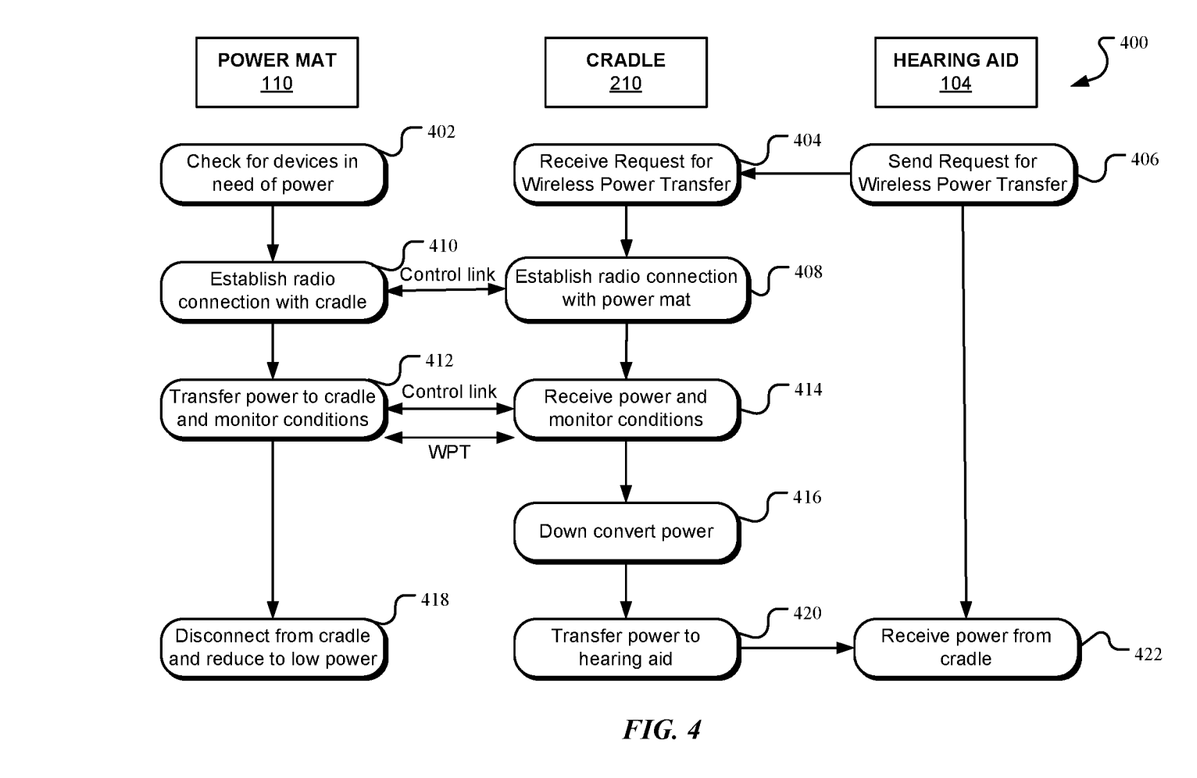
FIG. 4 is a flowchart of a method for receiving and providing power to a device.

FIG. 4 is a flowchart of a method 400 for using a power mat 110 for charging a hearing aid 104 using cradle 210 as an interface. Method 400 begins with operation 402, where the power mat 110 is enabled to check for devices in need of power. In operation 402, the power mat 110 is said to be operating in a power save state. During power save state, the power mat 110 is periodically performing load detection checks and checks for the number of devices in need of power. In performing load detection checks, the power mat 110 can identify devices requesting power transfer.

In operation 406, the hearing aid 104 may be docked in cradle 210 and sends a request for WPT to the cradle 210. The request for wireless power transfer may arrive as a control message with identification fields containing parameters including but not limited to the type of hearing aid, the brand of hearing aid, power charging requirements, etc. For example, a Bluetooth® connection may be established between the hearing aid 104 and the cradle 210 for WPT and details on the power charging requirements are transmitted during negotiation. In some instances, all identification data is transmitted. However, in other instances partial data may be received, in which case the cradle 210 may retrieve the rest from a memory component or from another device. For example, the control message sent from the hearing aid 104 may include the hearing aid type and brand as the identification data. Provided this information, the cradle 210 may obtain the power requirements by locating the type of hearing aid 104 within a repository located in memory 202 as described in FIG. 2.

Operation 404 continues at the cradle 210, with the receipt of the request for wireless power transfer made by the hearing aid 104. At the cradle 210, any missing identification information is retrieved in order to determine the amount of power needed by the hearing aid 104. In addition, any processing required for beginning the communication with the power mat 110 is performed. Once the details for power transfer are known, communication with the power mat 110 begins.

As indicated above and in conjunction with FIG. 3, in obtaining WPT from a wireless charging system such as the power mat 110, two radio connections may be established. Operation 408 is the establishment of the first link, a control link through a Bluetooth® connection. The Bluetooth® connection is a communication established between the cradle 210 and the power mat 110 used to negotiate the power transfer. For example, the cradle 210 uses the Bluetooth® connection to ensure the amount of energy needed is requested and will be transmitted.

In operation 410 the power mat 110 identifies the request to connect from the cradle 210 and enters power transfer state as the control link is established. The power mat 110 uses the control link to determine details about the cradle and other PRUs regarding the types of PRUs requesting power transfer, the number of PRUs, and varying sizes of each of the PRUs that need power to ensure the PRU can be supported and adequate power is provided.

Once the negotiation is complete, method 400 continues to operation 412 where the second link is established. In one embodiment, the second radio connection is a resonant induction connection established at 6.78 MHz frequency for wireless power transfer. The power mat 110 creates a magnetic field using a coil which creates a current when another coil is in proximity leading to the transfer of power. In addition, communication using the Bluetooth® connection continues between the power mat 110 and the cradle 210 for continuous monitoring and for detection of faults that can lead to overheating or overcharging.

At the cradle 210, operation 414, includes the receipt of power from the power mat 110 over the resonant induction connection. In addition, the cradle 210 also uses the control link connection to monitor the cradle 210 for conditions such as but not limited to determining charging time left, determining whether charging should cease, and determining if any fault conditions arise.

As the power is received at the cradle 210, the power is down converted in operation 416. Since the cradle 210 is a relay for safely charging the hearing aid 104, it should first down convert in order to provide adequate power. During operations 404 and 406, suitable power needed by the hearing aid 104 was determined, therefore, using this known amount, the cradle 210 can down convert the power received from the power mat 110 appropriately.

In operation 420, the down converted power is transferred to the hearing aid 104 in corresponding operation 422. In the power transfer operation 420, the cradle 210, using the sub-cradles 314, induces a magnetic field into its coils 304 which will result in energy being created by the coils 306 of the hearing aid 104 when in proximity to coils 304, docked in the cradle's 210 sub-cradles 314. As described above, the coils 306 from the hearing aid 104 when nearing the cradle 210 enter the magnetic field of the sub-cradles 314 which creates the electric current leading to a transfer of power. As the power is received at the hearing aid 104, it will be used to recharge the hearing aids' built in rechargeable battery. The hearing aids 104 will also be powered up for longer use during operation 422 and will be able to execute tasks such as, but not limited to, downloading data for memory 202 to 214 and vice versa.

In some instances, the internal battery for the hearing aid 104 may be completely discharged when placed in the sub-cradle 314 for recharging. In such an instance, some operations of the method 400 of FIG. 4 may not be performed, such that those operations performed by the hearing aid. For example, operation 406 may not be performed. Rather, a manual start of the hearing aid 104 may be initiated via the cradle's 210 external commands 310. On manual start, the cradle 210 may jump to operation 408 of the method 400. The power transferred in this circumstance may be such that the hearing aid 104 may power up or start to carry out one or more operations of the method 400.

At some point later in time (such as when the cradle is removed from the proximity to the power mat 110), the power mat 110 will no longer need to communicate with the cradle 210, thus the method ends at operation 418 where the power mat is no longer connected to the cradle 210 and reduced to low power operating state where it can routinely search for other devices in need of charging.

Figure 5:
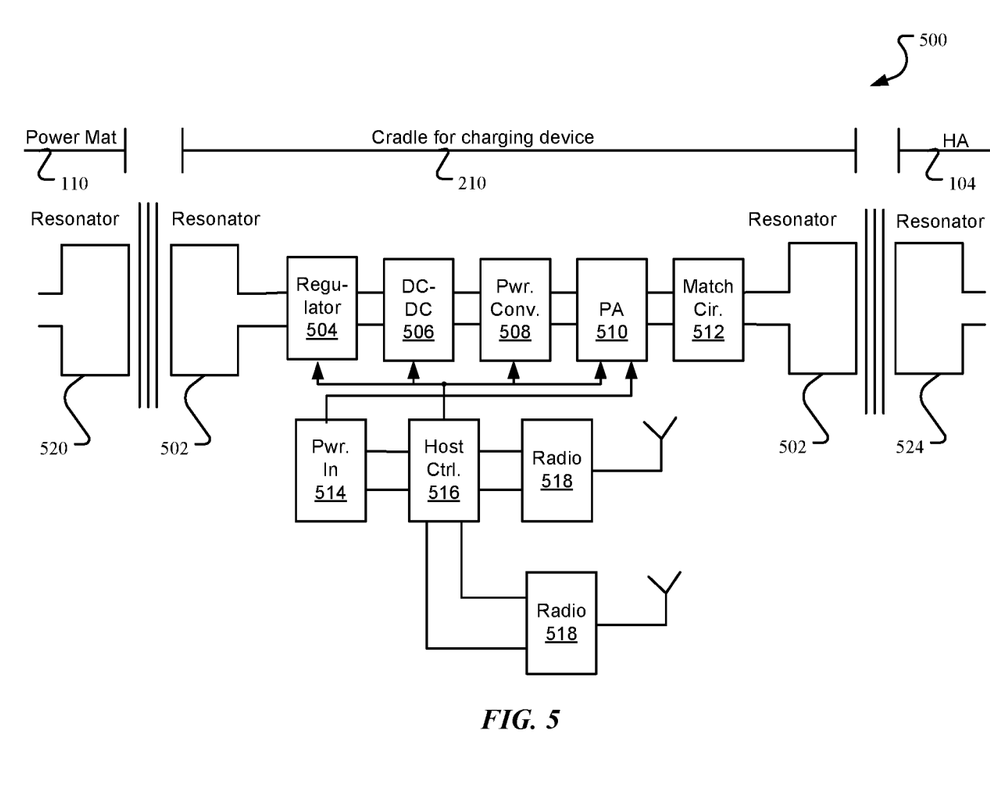
FIG. 5 is a circuit of an exemplary architecture of a cradle.

As indicated in FIG. 4, in the WPT procedure, communication between the cradle 210 and at least the power mat 110 and the hearing aid 104 occurs. To successfully communicate, the cradle 210 may be equipped with the architecture that allows the cradle 210 to interact with the multiple devices 110,104. FIG. 5 provides a diagram illustrating an exemplary architecture of the cradle 210. Since the cradle creates an interface between the power mat 110 and the hearing aid 104, both the power mat 110 and the hearing aid 104 are partially included in FIG. 5 as well.

As previously indicated, WPT is the transmission of electrical power from a source to a device without the use of wires. As such, resonators 502, 520, and 524 are illustrated at the ends of the devices 104, 110, 210 to enable the wireless transfer of power. The resonators 502, 520, 524 can be any components which induce the magnetic waves providing the transfer of power between the devices 104, 110, 210. For example, resonators 502, 520, 524 can be antennas used for receipt and transfer of power. In one embodiment, the resonators 502, 520, 524, can be coils that are embedded in the device 104, 110, 210 that may be used to create a loosely coupled connection. In addition, the coils can be of one or more windings and of varying sizes, types, and materials.

The cradle 210 may include other components which down convert, regulate and create the magnetic field for WPT. FIG. 5 for example, illustrates the use of a regulator 504 for rectification of the incoming waveform. The regulator 504 can regulate the energy received so that it may be used for charging. In addition, regulator 504 can also be used to clip any over voltage that may be present ensuring the signal is not too high and stable. After the incoming energy has been regulated, the signal arrives at the DC-to-DC converter 506. The DC-to-DC converter 506 is a component that may be used for the down (and/or up) conversion of a direct current signal to another direct current signal corresponding to a lower voltage necessary to provide a required power level. After the signal is down converted, the signal travels to a power converter 508, where some of the power collected can be allocated for the use by the cradle. That is to say, some of the power harvested by the cradle 210 from the power mat 110 can be used to feed the cradle 210 itself for powering the cradle, the radios, etc. Additionally, the remaining power collected is down converted and used for charging the hearing aid.

The cradle 210 being powered can also include a host controller 516, radios 518, and power node 514. The host controller 516 can function as the microcontroller, used to manage the cradle 210. The radios 518, included in the architecture of the cradle 210, can be used for the wireless communication that occurs between the cradle 210 and the power mat 110 and/or the cradle 210 and the hearing aids 104. Additionally, the radios 518 can be used to for communicating with external computing systems (e.g., manufacturers). The communication with the external computing systems can occur through the use of one or more wireless networks including WLAN, cellular 3G, 4G, LTE networks, etc.

In instances where the cradle 210 is used for WPT, the power that has been down converted gets used to create the magnetic field for charging. In one instance, the power that gets down converted, travels to the power amplifier (PA) 510, where it can get amplified for transmission. To ensure efficiency and stability of the signal that will be transferred, the signal gets matched using matching circuit 512. To match, the matching circuit 512 adapts the signal from the PA 510 to the type of coil (resonator 502) used in power transfer. Once matched, the cradle 210 can transfer the down converted power to the hearing aid 104 using resonators 502 and 524.

In some instances, a power mat 110 may not be available either because one is not around or the power mat 110 has reached charging capacity. In this instance, an alternate power node 514 can be used to charge the hearing aid 104. For example, the power node 514 can be an input USB power plug 308 (e.g., from a cell phone charger) for powering the HA 104 with the cradle 210. Note that when powered via power node 308, all the cradle 210 and the HA 104 may still be able to perform all other non-recharging related tasks including, but not limited to the downloading data from memory 202 of the cradle 210 to memory 214 of the HA 104 and vice versa.

As is the case with most electronics with embedded systems, software maintenance and upgrades are often provided. Hearing aids 104, wearables and other small devices are becoming more computerized, and as such do not escape the need for data log download and software maintenance. These tasks are cumbersome to perform when the device is in use and/or of small dimension. To facilitate these tasks, the smaller device can use an interface that can connect with an external computing device for data download, software maintenance, etc. Cradle 210 can be used as the interface for connecting with the external computing device. For example, cradle 210 can provide the interface for the hearing aid 104 to connect with the original manufacturer of the hearing aid 104 for remote maintenance.

As indicated above and in conjunction with FIGS. 2 and 5, the cradle 210 can be equipped with additional communication peripherals, to connect to an external computing system 212. In one example, the communication peripherals can include the use of an additional radio to establish a network connection with the external computing system 212. In another example, the communication peripherals can include the use of a USB plug 308 in conjunction with other processing units for a wired connection with the external computing system 212. Note that in some instances, the USB plug 308 can be used for powering the cradle 210 and/or communicating with the external computing system 212. The connection with the external computing system 212 can include the exchange of data logs, downloads, upgrades, and even remote maintenance.

Figure 6:
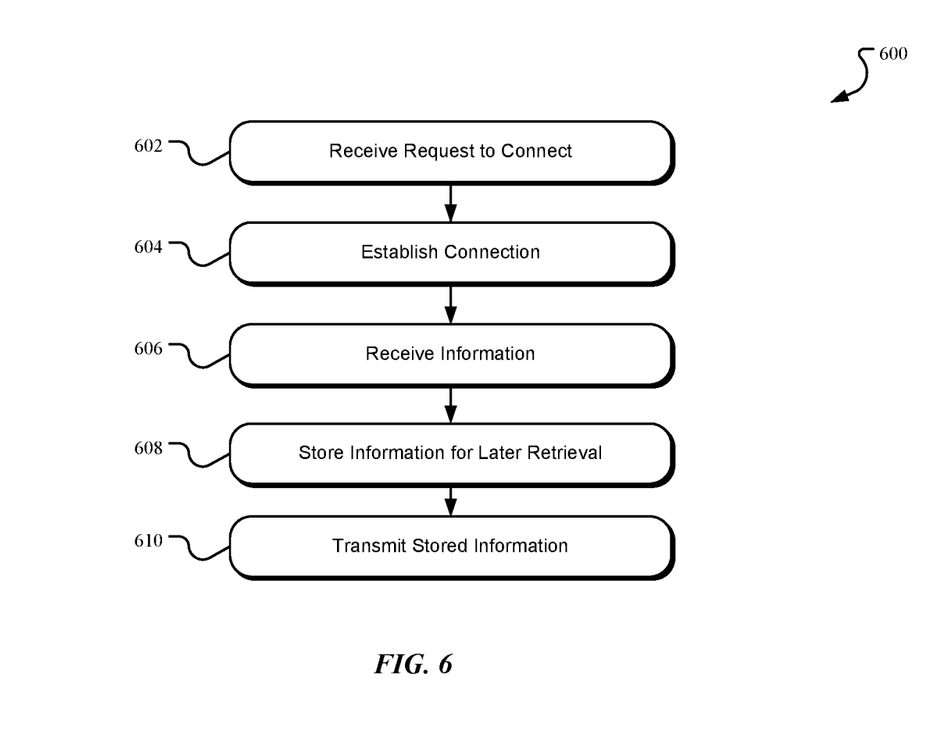
FIG. 6 is a flowchart of a method for data exchange with an external system.

To perform the connection between cradle 210 and the external computing system 212, method 600 in FIG. 6 is introduced. FIG. 6 is a flowchart of a method 600 for the connection and data exchange with an external computing system 212. Method 600 begins with operation 602, where the cradle 210 is enabled to check for an external computing system 212, wanting to establish a connection. The connection with the external computing system 212 can come in the form of a request with corresponding control information looking to establish a wireless or wired link with the cradle 210. In some instances, the cradle 210 may be idly waiting in standby mode. In other instances, the cradle 210 may be connected via a separate radio connection to another device for WPT or other communication.

At operation 604, the cradle 210 has established a connection with the external computing system 212 that sent the request to connect. The connection established between the cradle 210 and the external computing system 212 can be any type of connection which can enable the upload and download of information between the cradle 210 and the external computing system 212. In one example, the network connection can be but is not limited to a 3G/4G cellular network connection, a WLAN connection, a WPAN connection, WiMAX connection, WBAN connection, additional Bluetooth® connection, or an interconnection between multiple networks. In another example, the network connection can be a wired connection using a USB, Ethernet, MIDI, HDMI, coaxial cable or the like. Further, the USB may also be used for charging the cradle 210 and/or hearing aid 104.

Once connected, the cradle 210 is able to receive information from the external computing system in operation 606. For example, the cradle 210 is able to connect with the hearing aid 104 manufacturer for software upgrades. As another example, the cradle 210 is able to connect with a vendor which can provide remote maintenance support to the hearing aid 104. Yet as another example, the cradle 210 is able to connect with a laptop which has received and stored a software upgrade from a manufacturer.

In operation 608, the information that was received from the external computing system 212 may be stored for later retrieval. For example, if the information was a software upgrade, this information may be stored until the hearing aid 104 is docked in the cradle 210 for software download. In some instances, the hearing aid 104 may be docked while the cradle 210 is receiving the information from the external computing system 212. In these instances, the hearing aid 104 may receive the software upgrade automatically. In other instances, the upgrade may remain in memory until an indication from the hearing aid 104 is received specifying that the hearing aid 104 is ready for download.

In operation 610, the cradle 210 transmits the stored information received from the external computing device 212 to the hearing aid 104. As indicated above, the transfer of information may be automatic, after indication, or after an interval of time or occurrence (e.g., upon docking of the hearing aid 104).

Note that although method 600 has been described for the receipt of information from an external computing system 212, the cradle 210 can be used for the transmission of information to the external computing system 212. In one embodiment, the hearing aid 104 may upload data into the cradle 210 memory for transmission to the external computing system 212. For example, the hearing aid 104 can communicate with a personal computing device (e.g., smartphone). In another example, the hearing aid 104 using the cradle 210 as the interface can transmit biometric data to an external computing system 212 at a doctor's office. The doctor can use the information received to monitor a patient and determine if hearing aid replacement is necessary, a new type of hearing aid 104 should be considered, or adjustments need to be made to the hearing aid 104.

Also note that while the cradle 210 is communicating with the external computing system 212, the cradle 210 may be powered by using a portion of the power received during a WPT with the power mat 110 and/or using power plug 308. In addition, the communication with the external computing system 212 can occur while the hearing aid 104 is docked in the cradle 210 or while on standby without the hearing aid docked.

Figure 7:
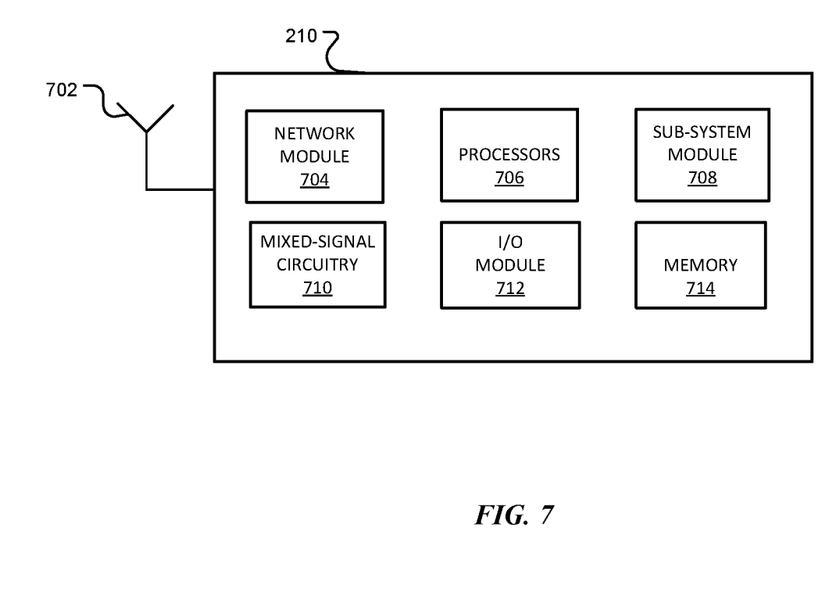
FIG. 7 is a diagram illustrating an example of a computer system which may be used in implementing embodiments of the present disclosure.

FIG. 7 is a block diagram of an example cradle 210 which can be used in implementing the embodiment of the present disclosure. As indicated, cradle 210 can be any wired or wireless device capable of communicating over a network and used as an interface between a power mat 110 and a smaller device like a hearing aid 104. Cradle 210 can include one or more processors 706 including computer system 204 which can be used to process the information received from one or more of the external devices (e.g., power mat 110, external computing system 212) in order to provide a report, information, power or other representation for use by the hearing aid 104.

Processor 706 can be coupled to at least a bus (not shown), controllers, memory and other modules. For example, the processors can communicate with a memory module 714 which can include one or more memory cards, control circuits, sub-memory modules 202, etc. Memory module 714 can further include a dynamic storage device, random access memory (RAM), read only memory (ROM) and/or other static storage devices that can be used for storing temporary and long term variables and other intermediate information during the execution of instructions by the processors 706. The memory module 714 can also be used for storing and transmitting information in a form of software or processing application readable by the computing system 204.

Sub-system module 708 can also be included in the architecture of the cradle 210. The sub-system module 708 for example can include the components responsible for the regulation and down conversion a power received by the cradle 210. Additionally or alternatively, the sub-system module 708 can include other components that may be needed in WPT and communication with external devices.

Cradle 210 can also include an input/output (I/O) module 712 for communicating with an input device (not shown) such as a microphone, where the cradle 210 may work as a recording device for replay at a later date and/or remote microphone.

For communicating with one or more other devices and/or networks, cradle 210 can include a network module 704. Network module 704 can be a module that allows for communication between the cradle 210 and at least the power mat 110, external computing system 212, the current network and secondary backup network, etc. Network module 704 can enable the transmission of information being processed by processors 706 over the air via network interface 206 with the aid of mixed-signal circuitry 710. The mixed-signal circuitry 710 can be a signal conditioning module that enables the transmission and conversion of digital signals into analog signals for channel transmission. The mixed-signal circuitry 710 can include filters, quantizers, amplifiers and even analog to digital converters for interfacing between the network module 704 and the one or more antennas 702.

Antennas 702 can be used for the wireless transmission of signals in instances where the primary and/or backup service is wireless. Antennas 702 on cradle 210 can be one or more antennas that can be used for single input single output (SISO) transmission, multiple input single output (MISO) transmission, single input multiple output (SIMO) transmission, or multiple input multiple output (MIMO) transmission as commonly used in cellular communications. The use of multiple antennas 702 can be used to provide increase efficiency and data throughput by taking advantage of spatial and multiplexing diversity. Further, MIMO communications provide increased reliability as the information stream can be sent multiple times over the various antennas in order to overcome possible nulls or deep fades in a channel transmission. Still further, the use of antennas 702 can enable communication over various wireless networks including WLAN, cellular, WMAN, WPAN, etc., including mesh network interconnectivity. Note that in addition to antennas 702, resonators 502 can also exist as antennas for the transmission and reception of power.

The system set forth in FIG. 7 is but one possible example of a computer system that may employ or be configured in accordance with aspects of the present disclosure. FIG. 7 illustrates a system architecture for signal communication on a device including hearing aid 104. The computer architecture described is very simplified and can contain additional systems for performing additional processes within the hearing aid 104. The hearing aid 104 can work jointly or independently of the additional systems that can exist within the device, external devices, and/or networks. The components of the hearing aid 104 may communicate over any number of networks, including telecommunication networks and wireless networks. Further, it should be noted that the hearing aid 104 may include any number of additional or fewer components, including components used to communicate between the components shown. Also, the functionality of the components described may be applied to two or more components of the system. For example, the power management module 208 may be used for the power receipt and transfer between at least the power mat 110 and hearing aid 104.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of device) executing the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, comprising:
a system configured for:
receiving a request for power transfer from a device, wherein the request comprises device information used to obtain a power level for charging the device;
establishing a first radio connection with an external power source based on the request received;
establishing a first induction connection with the power source for wireless power transfer;
maintaining the first radio connection established to monitor power transfer conditions while receiving power on the first induction connection wherein a level of the power received from the first induction connection is greater than the power level for charging the device;
down converting a first portion of the level of the power received with the first portion corresponding to the power level obtained during the request for power transfer, and transferring the down converted first portion over a second induction connection to the device, while still receiving power on the first induction connection; and
using a second portion of the level of the power received for power to operate the system wherein the level of the power received is no less than a sum of the first portion and the second portion.

2. The method of claim 1, wherein the request for power transfer occurs over a second radio connection between the system and the device.

3. The method of claim 1, configuring the system to include a cradle wherein the first radio connection is a control link used to negotiate the wireless power transfer between the cradle and the power source.

4. The method of claim 1, wherein the first induction connection is a loosely coupled resonant induction connection used for the wireless power transfer from the power source to the cradle, and wherein the power transferred to the cradle is greater than the power level for charging the device.

5. The method of claim 1, configuring the system to include a cradle wherein a third radio connection is established with an external system for transfer of information between the external system and the cradle.

6. The method of claim 1, wherein the device information includes a device type and the power level for charging the device.

7. The method of claim 3, wherein the device information includes an indicator of a device type used by the cradle to obtain the power level for charging the device from a storage device.

8. The method of claim 3, wherein the second portion of the level of the power received from the first induction connection powers the cradle.

9. The method of claim 1, wherein the down converted first portion is transferred to the device using a plurality of sub-cradles.

10. A system interface for wireless power transfer, comprising:
a processor, the processor configured to:
process a request for power transfer from a device, wherein the request comprises device information used to obtain a power level for charging the device;
at least one radio, the at least one radio configured to:
establish a first radio connection with a power source based on the request received;
a first resonator, the first resonator configured to:
establish a first induction connection with the power source for wireless power transfer;
the at least one radio further configured to:
maintain the first radio connection established to monitor power transfer conditions while receiving a level of power on the first induction connection wherein the level of power that is received from the first induction connection is greater than the power level for charging the device;
a regulator, the regulator configured to:
down convert a first portion of the level of power wherein the first portion corresponds to substantially the power level obtained during the request for power transfer, and to use a second portion of the level of power to power the system interface; and
a second resonator, the second resonator configured to:
transfer the down converted first portion over a second induction connection to the device.

11. The system interface of claim 10, wherein the request for power transfer occurs over a second radio connection.

12. The system interface of claim 10, wherein the first radio connection is a control link used to negotiate the wireless power transfer between the power source and the system interface, wherein the system interface is a cradle.

13. The system interface of claim 10, wherein the system interface includes a cradle and wherein the first induction connection is a loosely coupled resonant induction connection used for the transfer of the level of power from the power source to the cradle.

14. The system interface of claim 10, wherein the resonant induction connection uses a plurality of resonators.

15. The system interface of claim 10, wherein the system interface includes a cradle and wherein the second portion of the power received from the first induction connection powers the cradle.

16. The system interface of claim 10, further includes establishing a third radio connection with an external system, wherein information is received from the external system over the third radio connection.

17. The system interface of claim 16, wherein the information received from the external system is transmitted to the device.

18. The system interface of claim 17, wherein the information stored can include a software upgrade.

19. A method, comprising:
configuring a system for:

establishing a radio connection with a power transfer interface for negotiating wireless power transfer with a device;

establishing a resonant induction connection with the power transfer interface and receiving a level of power over the resonant induction connection wherein the level of power is greater than an amount of power to transfer to the device;

maintaining the radio connection established to monitor power transfer conditions while receiving the level of power on the resonant induction connection; and regulating a first portion of the level of power for use to power the device, and using a second portion of the level of power for powering the system.

* * * * *